(12) United States Patent
Aymonier et al.

(10) Patent No.: US 11,492,259 B2
(45) Date of Patent: Nov. 8, 2022

(54) METHOD FOR MANUFACTURING METAL PHOSPHATE NANOPARTICLES BY SUB- AND SUPERCRITICAL SOLVOTHERMAL SYNTHESIS AND NANOPARTICLES OBTAINED BY THIS METHOD

(71) Applicants: CENTRE NATIONAL DE LA RECHERCHE SCIENTIFIQUE, Paris (FR); UNIVERSITÉ DE BORDEAUX, Bordeaux (FR); UNIVERSITY OF AARHUS, Aarhus C (DK)

(72) Inventors: Cyril Aymonier, Pessac (FR); Bo Brummerstedt Iversen, Skødstrup (DK); Gilles Philippot, Ayguemorte les Graves (FR); Nils Lau Nyborg Broge, Aarhus N. (DK)

(73) Assignees: CENTRE NATIONAL DE LA RECHERCHE SCIENTIFIQUE, Paris (FR); UNIVERSITÉ DE BORDEAUX, Bordeaux (FR); UNIVERSITY OF AARHUS, Aarhus C (DK)

( * ) Notice: Subject to any disclaimer, the term of this patent is extended or adjusted under 35 U.S.C. 154(b) by 208 days.

(21) Appl. No.: 16/625,180
(22) PCT Filed: Jun. 26, 2018
(86) PCT No.: PCT/EP2018/067145
§ 371 (c)(1),
(2) Date: Dec. 20, 2019
(87) PCT Pub. No.: WO2019/002313
PCT Pub. Date: Jan. 3, 2019

(65) Prior Publication Data
US 2020/0140277 A1  May 7, 2020

(30) Foreign Application Priority Data
Jun. 26, 2017  (EP) .................................. 17305793

(51) Int. Cl.
| C01B 25/37 | (2006.01) |
| B82Y 30/00 | (2011.01) |
| B82Y 40/00 | (2011.01) |

(52) U.S. Cl.
CPC ............. *C01B 25/375* (2013.01); *B82Y 30/00* (2013.01); *B82Y 40/00* (2013.01); *C01P 2004/64* (2013.01)

(58) Field of Classification Search
CPC ..... C01B 25/375; C01B 25/37; C01B 25/372; C01B 25/377; B82Y 30/00; B82Y 40/00; C01P 2004/64; Y02P 20/54
See application file for complete search history.

(56) References Cited

U.S. PATENT DOCUMENTS

| 2011/0050399 A1* | 3/2011 | Dardari | G06K 19/0723 340/10.4 |
| 2013/0022866 A1* | 1/2013 | Noh | C01B 25/26 429/211 |

FOREIGN PATENT DOCUMENTS

| CN | 104692350 B | 7/2016 |
| CN | 105800585 A | 7/2016 |

(Continued)

OTHER PUBLICATIONS

Tagiyev et al., "Hydrothermal Synthesis of Zeolite-Like Iron and Zinc Phosphates and its Application in the Methanol Conversion," Studies in Surface Science and Catalysis, vol. 154, 2004, 1049-1055. (Year: 2004).*

(Continued)

*Primary Examiner* — Anthony J Zimmer
(74) *Attorney, Agent, or Firm* — Troutman Pepper Hamilton Sanders LLP

(57) ABSTRACT

A method for manufacturing metal phosphate hydrate nanoparticles wherein metal reactants are selected from metal precursors of transition metals, phosphate precursors are (Continued)

selected from: Trisodium phosphate $Na_3PO_4$, disodium phosphate $Na_2HPO_4$, phosphoric acid $H_3PO_4$ and hypophosphoric acid $H_4P_2O_6$, wherein said method comprises the following step of a reaction medium comprising at least a metal reactant, a phosphate precursor and a solvent, is submitted to a solvothermal treatment at a pressure superior to 50 MPa, and at a temperature of from 100 to 350° C.

13 Claims, 4 Drawing Sheets

(56) References Cited

FOREIGN PATENT DOCUMENTS

| JP | 2012-167314 | A |   | 9/2012 |
|----|-------------|---|---|--------|
| JP | 2012167314  | A | * | 9/2012 |
| WO | 2015/159006 | A1 |  | 10/2015 |

OTHER PUBLICATIONS

Chipera, S. J., et al. "Fitting Full X-Ray Diffraction Patterns for Quantitative Analysis: A Method for Readily Quantifying Crystalline and Disordered Phases" Advances in Materials Physics and Chemistry 3:47-53 (2013) cited in Specification.

He, L., et al. "Facile fabrication of zinc phosphate-based nanocomposites for high-performance electrochemical sensing of Hg(II)" Sensors and Actuators B: Chemical 228:500-508 (2016) cited in Specification.

Herschke, L., et al. "The Role of Hydrogen Bonding in the Crystal Structu4res of Zinc Phosphate Hydrates" Chem. Eur. J. 10:2795-2803 (2004) cited in Specification.

Herschke, L., et al. "Zinc phosphate as versatile material for potential biomedical applications Part 1" Journal of Materials Science: Materials in Medicine 17:81-94 (2006) cited in Specification.

Liao, S., et al., "Synthesis and Regulation between NaH(ZnP04)2 and α-Hopeite via a Solid State Reaction at Low-heating Temperatures" Chinese Journal of Chemistry 26:1837-1842 (2008) cited in Specification.

Pawling, O., et al. "Synthesis and Characterization of α-HOPEITE, Zn5(PO4)2•4H2O" Materials Research Bulletin 34(12/13): 1959-1966 (1999) cited in Specification.

Zhang B., et al. "Preparation of lipase/Zn3(PO4)2 hybrid nanoflower and its catalytic performance as an immobilized enzyme" Chemical Engineering Journal 291:287-297 (2016) cited in Specification.

Zhang, B., et al. "Red-blood-cell-like BSA/Zn3(PO4)2 hybrid particles: Preparation and application to adsorption of heavy metal ions" Applied Surface Science 366:328-338 (2016) cited in Specification.

International Search Report issued in corresponding International Patent Application No. PCT/EP2018/067145 dated Aug. 30, 2018.

European Search Report issued in corresponding European Patent Application No. 17 30 5793 dated Sep. 5, 2017.

Mekhatria D., et al. "A New Inorganic-Organic Hybrid Zinc Phosphate Prepared with L-Histidine with an Unusual Stability in Water" American Chemical Society, Crystal Growth & Design 11(2):396-404, Feb. 2, 2011 cited in ISR submitted herewith.

Harmon, S. B., et al., "Synthesis and Characterization of a New Three-Dimensional Organically Templated Zinc Phosphate, Zn6(PO4)4(HPO4)(H2O)(H3NCH2CH2NH3), with a Chain of Corner-Lined ZnO4 Tetrahedra" Chemistry of Materials 10(10)13020-3023 Oct. 1, 1998 cited in ISR submitted herewith.

Xu et al., "Continuous and Batch Hydrothermal Synthesis of Metal Oxide Nanoparticles and Metal Oxide-Activated Carbon Nanocomposites" Disserta, Georgia Institute of Technology, pp. 1-240 (258 pages submitted) Dec. 1, 2006, XP009173372 cited in EP SR submitted herewith.

* cited by examiner

METHOD FOR MANUFACTURING METAL PHOSPHATE NANOPARTICLES BY SUB- AND SUPERCRITICAL SOLVOTHERMAL SYNTHESIS AND NANOPARTICLES OBTAINED BY THIS METHOD

CROSS REFERENCE TO RELATED APPLICATIONS

This is a U.S. National Phase Application under 35 U.S.C. § 371 of International Patent Application No. PCT/EP2018/067145, filed Jun. 26, 2018, which claims priority of European Patent Application No. 17305793.6, filed Jun. 26, 2017. The entire contents of which are hereby incorporated by reference.

FIELD OF THE INVENTION

The invention is directed to a method for the solvothermal synthesis of metal phosphate, notably zinc phosphate. The method can be a continuous flow method. The method allows the surface functionalization of metal phosphate nanoparticles, notably metal phosphate hydrate nanoparticles, especially functionalization by organic ligands. Surface grafted nanoparticles thus obtained are another object of the invention. Zinc phosphate nanoparticles can be used as anticorrosion agent in varied applications, notably in paint compositions. Other applications, in the biomedical and energy fields, can also be envisioned.

BACKGROUND

Corrosion of materials generates three main risks: i) structural risks associated to the weakening of the stability of the buildings, ii) public and environmental health risks in case of failure of containers filed with hazardous materials and iii) economic risks. The main approach to limit this phenomenon is to coat sensitive materials with corrosion protective films. These protective films may be organic, metallic, or hybrid. The use of metallic zinc phosphate hydrate ($Zn_2M(PO_4)_2 \cdot 4H_2O$ with M: metal) is recognized as having a key role in such treatments.

To date, micro-cracks appearing in materials remain a major obstacle to the achievement of effective anticorrosion treatments. Anti corrosion protection is carried out by surface passivation, galvanizing and/or deposits of hybrid "barrier" layers (inorganic and organic).

The use of nanoparticles penetrating these micro-cracks as anticorrosion material is an attractive solution. It would be possible to prepare low viscosity suspensions of nanoparticles for making deposits with a resolution on the micrometer scale.

One difficulty is the preparation of zinc phosphate nanoparticles of controlled characteristics (size, size distribution, crystallinity). Notably, the crystallinity of zinc phosphate is an important characteristic to obtain satisfying anti-corrosion properties.

Various crystalline phases and hydration states are known to exist for zinc phosphate. The most common is orthorhombic hopeite with composition $Zn_3(PO_4)_2 \cdot 4H_2O$.

A triclinic polymorph is known as parahopeite. This structure is less investigated though, and normally not found present in anticorrosive treatments in opposition to hopeite. Parahopeite is known as $Zn_2X(PO_4)_2 \cdot 4H_2O$ with X being Zn, Fe, Mn or Mg. This formula illustrates how two distinct cation sites are present. This is also true for the compounds formed upon reaction between certain materials and anticorrosive zinc phosphate layers, for example the monoclinic phosphophyllite $Zn_2(PO_4)_2 \cdot 4H_2O$.

Different structures for hopeite have been published in the last 60 years. Only few of the atoms are found in high symmetry positions; this gives more freedom in the solving of the structure. This is seen when comparing the structures, as the atomic positions are unlike in all cases. Also, the presence of water molecules troubles the structure determination. The hydrogen atoms are invisible to normal X-ray crystallography, but they still contribute to the overall electron density. It is also likely that the water molecules have more freedom to move in the structure than highly coordinated atoms.

To sum up, zinc phosphate is found to exist as triclinic parahopeite and orthorhombic hopeite at ambient conditions. Hopeite is observed in different polymorphs named α, β and sometimes γ, even though the presence and nature of this third polymorph is not well established. These vary in the orientation of a fraction of the water molecules in the structure and thus the hydrogen bonding pattern. This difference is seen with the use of thermal analysis and infrared spectroscopy.

The use of zinc phosphate is not limited to the field of anticorrosion. In odontology zinc phosphate based cements for teeth fillings and reconstructions are well described. Also papers on the synthesis and characterization of a variety of open framework and layered structures of zinc phosphate and organic molecules are present. The same goes for zinc phosphate glasses which have found use in different specialized applications due to their unique thermal behaviour and their durability. B Zhang et al., Applied Surface Science 366 (2016) 328-338 discloses red-blood-cell-like bovine serum albumin (BSA)/$Zn_3(PO_4)_2$ hybrid particles and their use as heavy metal ions adsorbing agents. Linghao He et al., Sensors and Actuators B 228 (2016) 500-508 discloses zinc phosphate-based nanocomposites for high-performance electrochemical sensing of Hg(II). B Zhang et al., Chemical Engineering Journal, 291 (2016) 287-297 discloses lipase/$Zn_3(PO_4)_2$ hybrid nanoflower and its catalytic activity. Prior art methods use co-precipitation to prepare surface functionalized hybrid particles, whereas the method according to the invention permits chemical grafting of an organic molecule to the surface of the particles.

Several prior art authors have disclosed methods for preparing zinc phosphate nanoparticles. Prior art methods can be summarized as follows:

Different salts of zinc are used as reactants. Both organic and inorganic salts are reported.

The sources of phosphate all have the composition $X_{3-w}H_wPO_4$ with X=H, Na, $NH_4$, K, phosphoric acid or a sodium phosphate being most common sources.

The synthesis can proceed as a direct precipitation at relatively low temperatures, synthesis at higher temperatures being poorly described.

The products are generally tetrahydrates. Only some of the more recent papers distinguish between the hydrogen-modified structures, but this is challenged by lack of a high precision characterization method and consistent results.

The effect of pH is found to be important, with a value around 3 to 6 giving the best results.

According to Pawlig & Trettin (Materials Research Bulletin 34, 1959-1966 (1999)) phase pure a hopeite can be synthesized using zinc acetate and phosphoric acid. Later, Herschke et al (Chemistry-A European Journal 10, 2795-2803 (2004); Journal of Materials Science: Materials in Medicine 17, 81-94 (2006)) reported the temperature dependent synthesis of both α and β hopeite with a very similar method. In the work by Liao et al (Chinese Journal of Chemistry 26, 1837-1842 (2008)), it is found that both the layered structure NaH(ZnPO$_4$)$_2$ and a hopeite can result from the reaction between zinc sulfate, nitrate or chloride and Na$_2$HPO$_4$. When aged at room temperature, a hopeite is obtained and when aged at 60° C. NaH(ZnPO$_4$)$_2$ is obtained.

The crystallite sizes of the products disclosed in the prior art span over a wide range from large single crystals and coating crystallites of hundreds of micrometers to nano-sized products with sizes around 20-50 nm. Also the morphologies vary significantly. However, an efficient method for control of these important characteristics has not yet been shown.

Metal phosphate synthesis through solvothermal treatment is known, but has been applied at conditions of temperature, pressure and duration of treatment that are not compatible with the simultaneous surface grafting of organic molecules.

Surface functionalization of metal phosphate with hydrophilic or hydrophobic molecule is desired to facilitate the dispersion of the nanoparticles in varied solvent media. Actually, organic grafted metal phosphate nanoparticles, especially zinc nanoparticles form more stable colloidal suspensions. Surface functionalization of metal phosphate, especially zinc phosphate, nanoparticles with organic functionalities is a difficult task: classic high temperature functionalization steps degrade the organic graft. Transformation of amorphous to crystalline nanoparticles of metal phosphate functionalized by organic groups also is deleterious to the organic graft because it requests a thermal treatment that is not compatible with the organic structure.

Therefore, there existed a need for a method capable of providing organic surface grafted nanoparticles of metal phosphate, especially zinc phosphate.

There also existed a need for a method that can easily be applied at an industrial scale.

SUMMARY

An object of the invention is a method for manufacturing metal phosphate nanoparticles wherein:
  metal reactants are selected from: metal precursors of alkali metals, alkaline earth metals and transition metals,
  phosphate precursors are selected from: Trisodium phosphate Na$_3$PO$_4$, disodium phosphate Na$_2$HPO$_4$, phosphoric acid H$_3$PO$_4$ and hypophosphoric acid H$_4$P$_2$O$_6$,
  wherein said method comprises the following step:
  (i) a reaction medium comprising at least: a metal reactant, a phosphate precursor and a solvent, is submitted to a solvothermal treatment at a pressure superior to 5 MPa, and at a temperature of from 100 to 350° C.

Another object of the invention is a method for manufacturing transition metal phosphate hydrate nanoparticles wherein:
  metal reactants are selected from transition metals,
  phosphate precursors are selected from: Trisodium phosphate Na$_3$PO$_4$, disodium phosphate Na$_2$HPO$_4$, phosphoric acid H$_3$PO$_4$ and hypophosphoric acid H$_4$P$_2$O$_6$,
  wherein said method comprises the following step:
  (i) a reaction medium comprising at least: a metal reactant, a phosphate precursor and a solvent, is submitted to a solvothermal treatment at a pressure superior to 5 MPa, and at a temperature of from 100 to 350° C.

According to a favorite embodiment, the method is a continuous flow method.

According to a favorite embodiment, after step (i) the method comprises a step (ii):
  (ii) the reaction medium obtained at the end of step (i) is conditioned at a temperature below the temperature of the supercritical area of the solvent.

According to a favorite embodiment, the solvothermal treatment is applied for a length of time inferior or equal to 10 seconds.

According to a favorite embodiment, metal precursors are selected from salts, oxydes, hydroxydes of alkali metals, alkaline earth metals and transition metals, preferably they are selected from salts and oxides of Zn and/or Fe.

According to a favorite embodiment, metal precursors are selected from salts, oxydes, hydroxydes of transition metals, preferably they are selected from salts and oxides of Zn and/or Fe.

According to a favorite embodiment, the solvent is selected from water, an alcohol and mixtures of water with an alcohol.

According to a favorite embodiment, the concentration of the metal precursor in the reaction medium is from 0.0001 mol/l to the solubility limit, in particular from 0.001 mol/l to 0.1 mol/l, more particularly from 0.01 mol/l to 0.1 mol/l.

According to a favorite embodiment, the concentration of the phosphate precursor in the reaction medium is from 0.0001 mol/l to the solubility limit, in particular from 0.001 mol/l to 0.1 mol/l, more particularly from 0.01 mol/l to 0.1 mol/l.

According to a favorite embodiment, the temperature of the reaction medium in step (i) is at least 150° C., preferably from 150 to 350° C., in particular from 200° C. to 300° C.

According to a favorite embodiment, the pressure of the reaction medium in step (i) is from 10 MPa to 28 MPa, in particular from 20 MPa to 27 MPa.

According to a favorite embodiment, the method comprises a step of pre-heating a solution of the phosphate precursor before step (i), preferably the pre-heating temperature is at least 150° C., in particular from 150° C. to 400° C., more particularly from 200° C. to 350° C.

According to a variant, the reaction medium further comprises at least one ligand precursor.

According to a favorite embodiment of this variant, the ligand precursor is an organic ligand comprising a phosphate acid group or a phosphonic acid group.

According to a favorite embodiment of this variant, the molar ratio of ligand precursor/metal precursor in the reaction medium is from 0.05 to 10, in particular from 0.1 to 1, more particularly from 0.15 to 0.2.

Another object of the invention are nanoparticles.

In one embodiment, said nanoparticles are metal phosphate hydrate nanoparticles.

In one embodiment, said nanoparticles are metal phosphate hydrate nanoparticles, the surface of which is grafted by at least an organic ligand.

In one embodiment, said nanoparticles are surface grafted metal phosphate nanoparticles, and notably surface grafted metal phosphate hydrate nanoparticles In particular, said nanoparticles are obtainable or obtained by a method according to the present invention.

In one preferred embodiment, the reaction medium comprises at least one ligand precursor, Another object of the invention are nanoparticles capable of being obtained by a method according to the present invention wherein the reaction medium further comprises at least one ligand precursor, wherein the nanoparticles consist of metal phosphate nanoparticles the surface of which is grafted by at least an organic ligand.

A "method according to the present invention" means a method for manufacturing metal phosphate nanoparticles as described in the present document including all embodiments, variants, preferred and/or advantageous features, and any combination thereof.

The method according to the invention is based on the solvothermal technology, preferably the hydrothermal technology, for synthesizing nanoparticles. In these conditions it is possible to obtain micro- or nanoparticles, in a continuous process, with a very short residence time, inferior or equal to 10 s, at moderate temperatures (<400° C.). In addition, the nanoparticles obtained by this method have high purity, which has never been obtained with prior art methods. Finally, it is entirely possible to implement this method on an industrial scale.

The method according to the invention provides the ability to control characteristics that the prior art methods did not permit, and notably:

The exact composition and phase(s) of the nanoparticles
The hydration state of the nanoparticles
The size and the size distribution of the nanoparticles
The morphology of the nanoparticles
The stability of the nanoparticles (the tendency to form agglomerates and/or to sediment).

Thus it is possible, by using the method according to the invention, to obtain particles with finely tuned characteristics.

Furthermore, the method according to the invention is characterized by a high yield and a low energy consumption. It can easily be transposed on an industrial scale.

Furthermore, the method according to the invention can be used to produce surface grafted metal phosphate nanoparticles, notably surface grafted metal phosphate hydrate nanoparticles, with varied organic functionalities without any additional step.

The method according to the invention can easily be extrapolated to an industrial scale. Batch processes according to the prior art are less practical from an industrial point of view than continuous method.

Process parameters are better controlled in a continuous method according to the invention comparatively with prior art batch methods.

DETAILED DESCRIPTION

Figure 1:
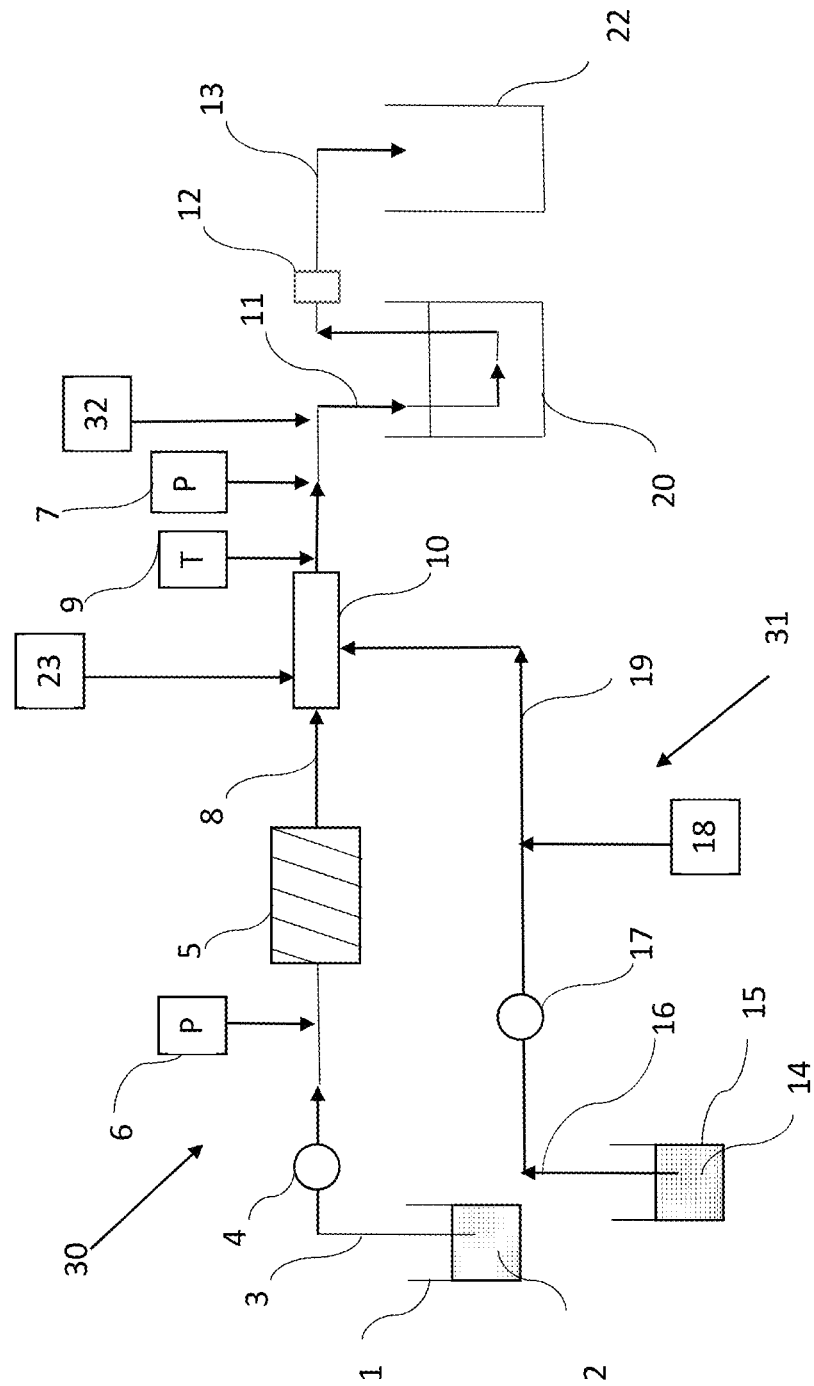
FIG. 1: Schematic drawing of the two lines continuous flow reactor.

The term "consists essentially of" followed by one or more characteristics, means that may be included in the process or the material of the invention, besides explicitly listed components or steps, components or steps that do not materially affect the properties and characteristics of the invention.

The expression "comprised between X and Y" includes boundaries, unless explicitly stated otherwise. This expression means that the target range includes the X and Y values, and all values from X to Y.

Solvothermal synthesis is a method of producing a compound from precursor reactants in a solvent above Patm and room temperature, wherein the reaction is conducted in an autoclave.

Metal Reactant

Metal reactants are selected from metal precursors of alkali metals, alkaline earth metals and transition metals.

Metal precursors means compounds capable of liberating at least one of alkali metals, alkaline earth metals and transition metals in the reaction medium.

A metal precursor can be a metal salt, a metal oxide, or a metal hydroxide. For example, metal precursors are selected from salts, oxydes, hydroxydes of transition metals and any one of their combinations.

Among salts, one can mention:
an inorganic acid salt such as: a nitrate, a chloride, a sulfate, an oxyhydrochloride, a phosphate, a borate, a carbonate, a sulfite, a fluoride or an oxyacid salt;
an organic acid salt such as an alkoxide (methoxide, ethoxide, propoxide, butoxide for example), a formate, an acetate, an acetylacetonate, a citrate, an oxalate, a lactate.

Favorite metal precursors are selected from: an acetate or an acetylacetonate.

Among metals that can be used one can mention in a non limitative manner: Cu, Ba, Ca, Sr, K, Rb, Zn, Al, Y, Si, Sn, Zr, Ti, Sb, V, Cr, Mn, Fe, Mg, Co, Ni, Cd.

Preferably, metals are selected from: Zn, Fe, Ni, Cu, Co, Mn, Mg.

Favorite metals are Zn, Fe and their mixtures.

According to a favorite variant, the metal reactants are prepared as a dispersion or solution in a solvent before introduction into the solvothermal reactor.

Phosphate Precursors:

In the sense of this invention, the expression "phosphate precursor" may also be used to describe a hypophosphate precursor. In this case, the expression "metal phosphate nanoparticle" will be understood as actually referring to metal hypophosphate nanoparticle.

Phosphate precursors are selected from trisodium phosphate $Na_3PO_4$, disodium phosphate $Na_2HPO_4$, phosphoric acid $H_3PO_4$ and hypophosphoric acid $H_4P_2O_6$.

According to a favorite variant, the phosphate precursors are prepared as a dispersion or solution in a solvent before introduction into the solvothermal reactor.

According to a favorite variant, the phosphate precursors dispersion or solution is pre-heated before introduction into the solvothermal reactor. Preferably pre-heating of the phosphate precursors solution or dispersion is to a temperature superior or equal to the temperature in the solvothermal reactor.

For example, if the solvothermal reactor is heated at a temperature of 100° C., the solution or dispersion of the phosphate precursors is conditioned at a temperature of 150° C.

Reaction Medium

The reaction medium can be any solvent adapted to dissolve suspend or disperse metal reactants and phosphate precursors. Preferably, the reaction medium is water or an alcohol, like methanol or ethanol, or a mixture of water and alcohol. Advantageously, the reaction medium is water or a mixture of water and alcohol, like methanol or ethanol.

Dilution of the reactants in the reaction medium is adapted according to the choice of a continuous process or batch process.

Each metal precursor is characterized by its solubility in a given solvent medium.

In a continuous process, advantageously, concentration of the metal precursor in the reaction medium is from 0.0001 mol/l to the solubility limit, in particular from 0.001 mol/l to 0.1 mol/l, more particularly from 0.01 mol/l to 0.1 mol/l.

In a continuous process, advantageously, concentration of the phosphate precursor in the reaction medium is from 0.0001 mol/l to the solubility limit, in particular from 0.001 mol/l to 0.1 mol/l, more particularly from 0.01 mol/l to 0.1 mol/l.

According to a favorite embodiment, the reaction medium is an aqueous reaction medium and the solvothermal synthesis is a hydrothermal synthesis.

According to the invention, a reaction medium is considered to be an aqueous reaction medium if the solvent used in the medium contains 5 mol % water or more.

In one embodiment the aqueous reaction medium used in the present invention is water.

In another embodiment the aqueous reaction medium used in the present invention is a mixture of water and one or more alcohols, for example methanol, ethanol, propanol, isopropanol, butanol, ethylene glycol, propylene glycol.

When the aqueous reaction medium is a mixture of water and alcohol, the molar ratio of water/alcohol, can be from 1:0 to 0:1, in particular from 0.25:0.75 to 0.75:0.25, in particular from 0.33:0.67 to 0.67:0.33, in particular around 0.5:0.5.

Ligand

The ligand or surface modifier used in the present invention is any compound able to strongly interact with the surface of the nanoparticles formed in the solvothermal reactor.

In a favorite embodiment it is any compound capable of binding covalently with the nanoparticles surfaces. Alternatively, the surface modifier may interact to the surface of the nanoparticles by chemisorbtion or physisorbtion. The ligand or surface modifier has to be soluble in the reaction medium.

To the difference of prior art hybrid nanoparticles, the nanoparticles according to the invention can be grafted after or simultaneously with nanoparticles preparation by a chemical grafting method. According to the prior art, hybrid nanoparticles were obtained by a co-precipitation method.

In one embodiment, the surface modifier is an organic ligand, thereby leading to hybrid organic-inorganic nanoparticles.

In one particular embodiment, the organic ligand contains an acid group, such as a carboxylic acid group, a phosphonic acid group or a sulfonic acid group, a silane group, an amine group or a thiol group.

Advantageously, the organic ligand contains an acid group selected from a phosphate acid group and a phosphonic acid group.

The amount of ligand injected into the reactor is adjusted depending on the desired rate of functionalization of the nanoparticles. Typically, the molar ratio of ligand/metal precursor in the reaction medium is from 20 to 1, in particular from 1 to 1, more particularly from 6 to 1.

The method according to the invention, permitting introduction of the ligand at different points of the reactor line(s), permits a control of the chemical or physical strength of the bond between the ligands and the nanoparticles.

Process

Advantageously, the process of the invention is performed in one-step by using solvothermal synthesis and in situ surface modification.

Advantageously, the process of the invention is a continuous flow process performed in a multi-injection continuous flow heated reactor.

Preferably, according to the invention, surface modified metal phosphate nanoparticles, notably surface modified metal phosphate hydrate nanoparticles, are formed by solvothermal synthesis in a reaction medium flowing within the continuous flow reactor. The starting materials, namely a metal reactant, a phosphate precursor and possibly a ligand, are introduced into the continuous flow heated reactor, preferably as pressurized flows in solution in a solvent.

The introduction of the ligand into the heated continuous flow reactor allows surface modification of the nanoparticles by grafting the ligand onto the surface of the nanoparticles in situ with the formation of the nanoparticles.

The continuous flow reactor is preferably a tube reactor, comprising at least one entry for the flow of reactants, and at least one exit for collecting the flow of reaction medium. According to a favorite embodiment, the reactor comprises at least two entries so that distinct flows of reactants can be introduced separately into the continuous flow reactor. The reactor may the reactor comprise three entries, the third entry permitting injection of the ligand "at will" at a different stage of the reaction. Such a device for carrying out the continuous flow process is known and is disclosed, for example in WO2015/159006.

Advantageously, the reactor comprises means for controlling and adjusting the pressure in the reactor.

Advantageously, the reactor comprises means for controlling the temperature in the reactor.

Temperature in the reaction medium depends on the composition of the reaction medium, notably the solvent, and can be determined based on the phase diagram of the solvent.

Advantageously and according to the invention, the temperature inside the solvothermal reactor is controlled by controlling the temperature of one of the reactant flows. The temperature may be controlled by any suitable means, for example by pre-heating said reactant flow.

The pressure in the reactor is controlled by the operator, for example by using a back pressure regulator, and the temperature in the reactor is the result of: the temperature of the reactant flows which is adjusted with a heating system, the control of pressure, the nature and the volume of the solvent.

The pressure is selected so that the reaction medium is monophasic, i.e. the reaction medium is above the liquid-vapor curve of the solvent.

Advantageously, the pressure is adjusted to a value of at least 1 MPa above the saturated vapour pressure of the solvent and equal or inferior to 25 MPa Advantageously, the pressure and temperature in the reactor are controlled so that the reaction medium is in the subcritical region.

Temperature in the reaction medium determines the nanoparticle size which is obtained.

Furthermore, the size distribution of the nanoparticles can be controlled by adjusting the type of flow, i.e. by choosing a turbulent flow or a laminar flow, a more turbulent flow leading to a narrower size distribution of the particles, by homogenization of the speed profile inside the reactor, or by adjusting the speed of the flow, the flow rate influencing the period of time during which the mixture is inside the reactor, thus influencing the time available for growth of the particle. An increased speed of the flow, or flow-rate, induces a reduced size of particles.

In order to perform a continuous process, the metal reactant, the phosphate precursor and optionally the ligand are preferably all introduced into the solvothermal reactor as flows in solution in a solvent which is miscible with the reaction medium. Furthermore, it is preferable that the metal reactant, the phosphate precursor and optionally the ligand be soluble in the reaction medium otherwise they may cause line, pump and filter clogging problems or hydrodynamic instabilities. Preferably, the reaction medium is an aqueous reaction medium.

The solvent of the flow of metal reactant and the solvent of the flow of phosphate precursor, and optionally the solvent of the flow of the ligand may be identical or different. The composition and flow rate of each flow can be adjusted depending on the composition of the reaction medium desired within the solvothermal reactor and depending on the relative amount of metal reactant, phosphate precursor and optionally ligand desired. Preferably, the solvent of the flow of metal reactant, the solvent of the flow of phosphate precursor and the solvent of flow of the ligand are water or a mixture of water and one or more alcohols, for example methanol, ethanol, isopropanol, butanol, ethylene glycol, propylene glycol.

Typically, the metal reactant, the phosphate precursor and optionally the ligand are each injected into the continuous flow reactor from a stock solution having a given concentration. These flows may be combined with a flow devoid of metal reactant, phosphate precursor and ligand, so as to obtain the desired concentrations in the reaction medium.

Advantageously, the concentration and flow rate of the solution metal reactant, the phosphate precursor and optionally the ligand are controlled to provide the stoichiometric amounts of metal and phosphate and the desired amount of grafted ligand.

According to a favorite variant, at least one of the flows of metal reactant, or of phosphate precursor is pre-heated before introduction into the solvothermal reactor.

Advantageously, the flow of phosphate precursor is pre-heated before introduction into the solvothermal reactor.

Preferably pre-heating of the flow is to a temperature superior or equal to the temperature in the solvothermal reactor.

For example, if the solvothermal reactor is heated at a temperature of 100° C., the flow or the flows are conditioned at a temperature of 150° C.

The advantage of pre-heating at least one of the flows of metal reactant, or of phosphate precursor is that upon entry into the solvothermal reactor, the reaction medium is at a temperature close to the solvothermal reaction temperature. The reaction kinetics is higher and the stay in the solvothermal reactor is shorter.

When an organic ligand is introduced into the solvothermal reactor, preferably, the solution wherein it is dissolved is generally not pre-heated, in order to avoid degradation.

When the ligand is introduced into the reactor, at least one of the other flows is at a temperature equal or superior to that of the reaction medium. Thus, the ligand is exposed to an elevated temperature, but for a length of time sufficiently short to avoid degradation.

The flow of the reaction medium is controlled such that exposition of the reaction medium to solvothermal conditions is for a length of time inferior or equal to 10 minute, advantageously inferior or equal to one minute, preferably inferior or equal to 30 seconds, even more preferably, inferior or equal to 10 seconds.

In one embodiment, the flow in the continuous flow heated reactor is a turbulent flow with a Reynolds number higher than 3000, in particular from 3000 to 5000.

In embodiments wherein said solvothermal reaction reactor is a tube, the residence time of the reaction medium is determined from the volume of the reaction tube (between the input and the output of this tube) wherein the reaction medium circulates, the flow imposed in the reaction tube and the density of the reaction medium (the latter being dependent on the temperature and pressure of the solvothermal treatment).

The relationship between the volumetric flow (Q), the residence time (ts), the reactor volume ($V_r$), the density ($p_i$) of the reaction medium at the reactor inlet and the density ($p_r$) of the reaction medium in the reaction reactor is as follows:

$$t_s = \frac{V_r \cdot \rho_r}{Q \cdot \rho_i}$$

Advantageously and according to the invention said solvothermal treatment is carried out under supercritical conditions or subcritical conditions and in particular under homogeneous sub-critical conditions.

In a particularly advantageous variant of a method according to the invention, one chooses the temperature and pressure at which the solvothermal treatment is carried out so that the reaction medium, particularly the liquid medium it comprises, is in subcritical conditions.

In the presence of a substantially aqueous reaction medium, the critical point of water (according to the water phase diagram) being located at 22,1 MPa and 374° C., hydrothermal treatment is carried out in the reactor at a temperature between 100° C. and 373° C. and at a pressure greater than 22,3 MPa, at a pressure higher than the saturation vapor pressure of the liquid medium at the chosen temperature (ie above the gas-liquid equilibrium curve of the water phase diagram).

According to the invention, a flow of metal phosphate nanoparticles, notably metal phosphate hydrate nanoparticles, possibly grafted with a ligand, is recovered at the end of the solvothermal reactor.

In a favorite embodiment, the flow of metal phosphate nanoparticles, notably metal phosphate hydrate nanoparticles, is quenched at a temperature below the temperature of the solvothermal reactor, by using a cooling device, such as a condenser, which allows recovery of the metal phosphate nanoparticles, notably metal phosphate hydrate nanoparticles, in the form of a liquid suspension. The metal phosphate nanoparticles, notably metal phosphate hydrate nanoparticles, can be recovered in dried form after filtering this suspension through a filter or after evaporating the solvent of the suspension.

Nanoparticles

In a particular embodiment, nanoparticles respond to formula (I): $M_3(PO_4)_2 \cdot 4H_2O$ with M a metal or a mixture of metals selected from alkali metals, alkaline earth metals and transition metals.

Advantageously M is a metal or a mixture of metals selected from: Cu, Ba, Ca, Sr, K, Rb, Zn, Al, Y, Si, Sn, Zr, Ti, Sb, V, Cr, Mn, Fe, Mg, Co, Ni, Cd.

Preferably, M is selected from: Zn, Fe, Ni, Cu, Co, Mn, Mg and their mixtures.

Favorite metals M are Zn, Fe and their mixtures.

According to a favorite embodiment, the recovered nanoparticles are selected from those of formula:

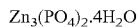

and

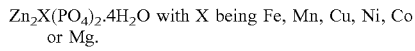

Concentration and flow rate of metal and phosphate precursors are adapted to provide the stoichiometric amounts corresponding to the selected formula.

The size of the nanoparticles ranges typically from 1 nm to 50 nm in diameter, in particular from 2 nm to 20 nm, for example between 5 nm and 10 nm.

Various crystalline structures of nanoparticles may be prepared with the process of the invention, depending on the type of metal reactant, phosphate precursor and optionally on the type of ligand used.

The nanoparticles may be grafted on their surface by a ligand.

Preferably, the ligand is an organic ligand comprising a phosphate acid group or a phosphonic acid group. Such reactive groups are particularly well adapted to react with metal phosphate nanoparticles, notably metal phosphate hydrate nanoparticles.

One can functionalise the nanoparticles with any type of organic molecule known to the skilled professional like, for example, hydrophobic molecules, hydrophilic molecules or still amphiphilic molecules including trioctylphosphine, trioctylphosphine oxide, oleic acid, hexanoic acid, DNA or RNA sequences, peptides, proteins, markers. . . .

Nanoparticles according to the invention distinguish over the prior art by the purity of the phase, which is observed by X-ray diffraction. Nanoparticles according to the prior art are generally characterized by the presence of at least two phases.

Nanoparticles according to the invention are characterized by a degree of crystallinity superior or equal to 90%. The degree of crystallinity is measured by the following method: Knowing that the intensity of a diffraction peak is directly proportional to the abundance of crystallized phase, it is possible to quantify the amount of amorphous phase in a sample using an internal standard which is fully crystallized. To do so it is first necessary to make sure that the internal standard will not have overlapping diffraction peaks with the sample. Then a known amount of this standard is added to the sample (around 20% in mole). The diffraction peaks can then be normalized to the standards one which is considered to be 100% crystalized. The difference with the sample will be considered as amorphous. Reference can also be made to the document S. J. Chipera, D. L. Bish, Materials Physics and Chemistry, 2013, 3, 47-53.

Crystallinity of the nanoparticles according to the invention is an essential characteristic for obtaining the resistance to aging that one expects for dental or anti-corrosion applications.

Reactor

The reactors can be any type of reactor capable of providing the conditions of pressure and temperature necessary to the process. Advantageously, the reactor is continuous flow reactor. The expression "continuous flow reactor" or "continuous reactor" designates any reactor for working with continuous flow and allowing a mixture of chemical species present in the reaction medium.

Any known continuous flow reactor can be used in the process according to the invention. Thus, advantageously and according to the invention, said continuous reactor is a continuous flow reactor at a constant volume. In a particularly advantageous variant of a process according to the invention, a continuous reactor is selected from the group consisting of piston reactors (or plug flow reactors). Such plug flow reactor is adapted so that all the chemical species of the reaction medium containing stoichiometric proportions of the nanoparticles are introduced simultaneously into the solvothermal reactor and have the same residence time in the solvothermal reactor. It can for example be a tubular reactor in which the flow of the reaction medium is a laminar, turbulent or intermediary flow. In addition, it is possible to use any co-current or against-the-current continuous reactor with respect to the introduction and contacting of the various compositions and/or liquid media contacted in the process according to the invention.

Advantageously and according to the invention, the reactor extends after its outlet by a portion of conduit comprising a device for regulating the pressure (such as for example a micrometric valve or needle or an automatic pressure controller) to a value, called nominal pressure, wherein the solvothermal treatment must be performed. The reaction medium is introduced into the reaction pipe at a predetermined rate as a function of residence time, for example using at least one displacement pump. This device allows to control the pressure within the entire continuous synthesis device including within the reactor. It also allows to ensure a transition between the pressure in the reactor and ambient pressure at the outlet of the continuous synthesis device, when retrieving the metal phosphate nanoparticles, notably metal phosphate hydrate nanoparticles in suspension or after an optional filtration.

Figure 2:
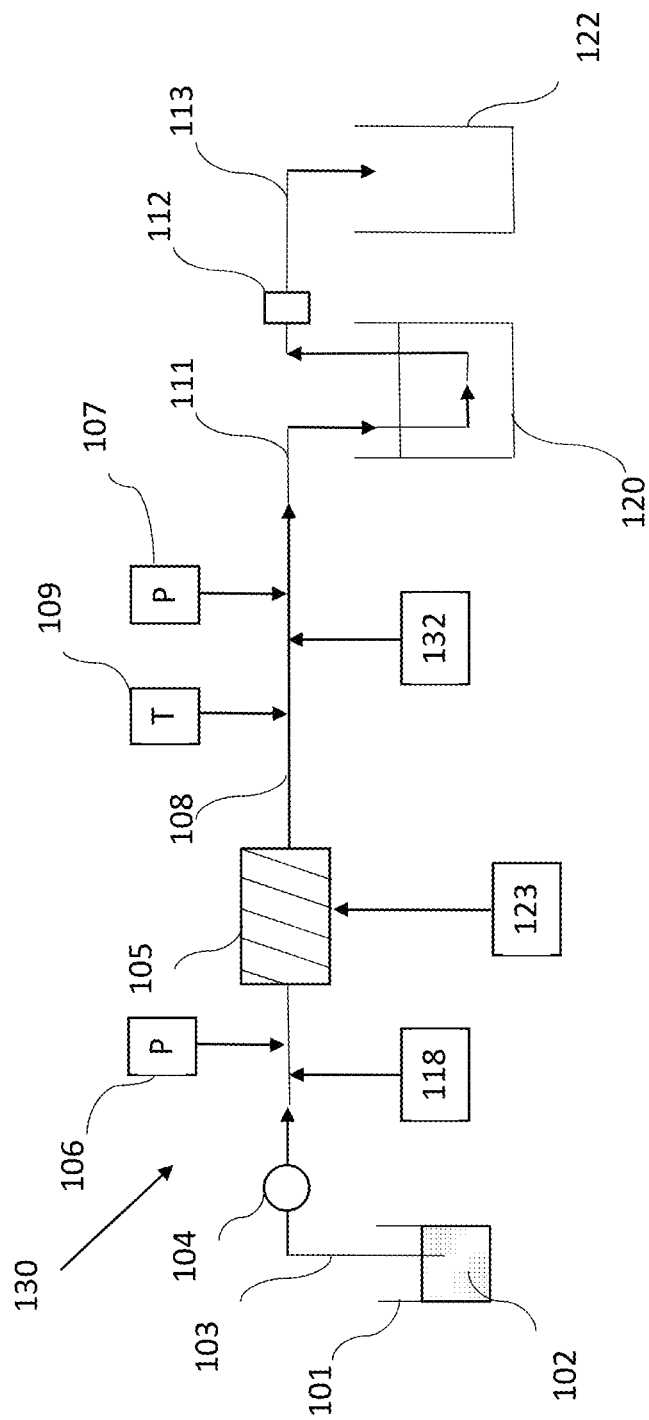
FIG. 2: Schematic drawing of the single line continuous flow reactor.

The method according to the invention is preferably achieved in a continuous flow reactor, which can be a single line reactor as illustrated on FIG. 2 or a two lines reactor as illustrated on FIG. 1.

A setup with two lines 30, 31 is preferred. The setup is illustrated in FIG. 1. The principle of this reactor is that one of the precursors 2 is preheated, transferred through the upper line 30, and mixed with another precursor 14 from a cold line 31.

On FIG. 1: The upper line 30 features a preheater 5, and mixes with the cold line 31 below at the mixing point 10. A thermocouple (T) 9 is installed at the mixing point 10. P is for "pressure gauge". Two pressure gauges 6 and 7 are located upstream and downstream of the preheater 5. Cooling is achieved via curling the tubing 11 in an ice bath 20 around 20 cm after the mixing point 10.

Following the path of the precursors 2, 14, the setup consists of a number of elements:

Precursor reservoirs 1 and 15

Pumps 4 and 17 to inject the precursor solutions 2 and 14 into the tubing system 3 and 16. Different flow rates can be chosen. The pumps 4 and 17 feature a shutdown mechanism if the pressure increases too much, for example because of clog formation. In this work the pumps 4 and 17 were of type Jasco PU-2080 Plus HPLC.

A check valve and a burst diaphragm (not represented) are installed just after each pump 4 and 17 for safety reasons. The manometer 6, located before the preheater 5 and the manometer 7 after the mixing point 10, allow the operator to monitor the pressure in the system. Optional reservoirs 18, 23 and 32, connected respectively to tubing 19, mixing point 10 and tubing 11, can permit injection of other reactants into the reactor, especially ligands.

The preheater 5 consists of a heating cartridge in the core, a cylinder of aluminium (ø=3 cm) to transfer the heat, coiled tubing to ensure extended contact and finally insulation to avoid extended heat loss and risk of burnings for the operator. Three meters of tubing is in contact with the heat source.

A T-piece 10 for mixing of the two streams 8 and 19. Both the T-piece 10 and the preheater 5 are made using ⅛" tubing, while the rest of the tubing is 1/16".

A thermocouple 9 is located just after the mixing point 10. This is mounted into the tubing with use of a graphite ferrule.

Cooling is carried out by immersing the coiled tubing 11 in an ice bath 20.

The pressure is controlled with a pressure release valve 12 at the outlet of the system. The products are collected in a container 22 and can be filtrated, washed and dried. The ligand can also be added in 22, equipped with appropriate mixing means.

A simple open/shutter valve (not represented) is put just before the pressure release valve 12. This is only used for cleaning the system by pressure cycling. These are performed after the end of the synthesis while cooling the system. In a cycle the valve 12 is shut and the pressure builds up. When the maximum pressure is reached, the valve 12 is opened and the tubing is emptied in a burst.

This set-up is characterized by a very short reaction time. As one of the precursors is already heated, the reaction temperature is instantly reached upon mixing. The tubing 11 is lead directly into the ice bath 20 for cooling, which makes the residence time in the hot part of the tubing very short, less than 1.5 seconds. The set-up is considered optimized with respect to avoid clogging: no hot reactor walls are in contact with the mixed precursor solutions, the size of the warm part, where the reactions are expected to happen, is minimized and high flow rates are utilized to generate a strong and turbulent flow.

Single line set-up:

With only one line, this setup is advantageous by its simplicity and low demands for equipment. The set-up is identical to the two lines set-up without the cold line and the mixing point. The set-up is illustrated in FIG. 2.

On FIG. 2: The line 130 features a preheater 105. A thermocouple (T) 109 is installed after the preheater 105. P is for "pressure gauge". Two pressure gauges 106 and 107 are located upstream and downstream of the preheater 105. Cooling is achieved via curling the tubing 111 in an ice bath 120.

Following the path of the precursors mixture 102, the set-up consists of a number of elements:

Precursor reservoir 101

Pump 104 to inject the precursor solution 102 into the tubing system 103. Different flow rates can be chosen. The pump 104 features a shutdown mechanism if the pressure increases too much, for example because of clog formation. In this work the pump 104 was of type Jasco PU-2080 Plus HPLC.

A check valve and a burst diaphragm (not represented) are installed just after the pump 104 for safety reasons. The manometer 106 is located before the preheater 105 and the manometer 107 after the the preheater 105 allow the operator to monitor the pressure in the system.

The preheater 105 consists of a heating cartridge in the core, a cylinder of aluminum (ø=3 cm) to transfer the heat, coiled tubing to ensure extended contact and finally insulation to avoid extended heat loss and risk of burnings for the operator. Three meters of tubing is in contact with the heat source. The preheater 5 is made using ⅛" tubing, while the rest of the tubing is 1/16".

A thermocouple 109 is located just after the heater 105. This is mounted into the tubing with use of a graphite ferrule.

Cooling is carried out by immersing the coiled tubing 111 in an ice bath 120.

The pressure is controlled with a pressure release valve 112 at the outlet of the system. The products are collected in a container 122 and can be filtrated, washed and dried.

Optional reservoirs 118, 123 and 132, connected respectively to tubing 103, preheater 105 and tubing 108, can permit injection of other reactants into the reactor, especially ligands.

A simple open/shutter valve (not represented) is put just before the pressure release valve 112. This is only used for cleaning the system by pressure cycling. These are performed after the end of the synthesis while cooling the system. In a cycle the valve 112 is shut and the pressure builds up. When the maximum pressure is reached, the valve 112 is opened and the tubing is emptied in a burst.

This setup is characterized by a very short reaction time.

Experimental Part:

Materials:

The following chemicals were retrieved from Sigma-Aldrich and used without further purification:

$Na_3PO_4$ (96%),
$Zn(acetate)_2 \cdot 2H_2O$ (≥98%),
$Fe(acetate)_2$ (95%),
$H_3PO_4$ (aq. 85 w %),
$H_4P_2O_6$ (aq. 50 w %),
$NH_4OH$ (aq. 28.0-30.0 w %, $NH_3$ basis).

Sodium hydroxide pellets in analytical grade were obtained from Normapur.

Methods:

The two-lines device as disclosed on FIG. 1 was used. The chosen set-up and parameters resulted in a very short residence time in the warm part of the tubing 10, 8, 11, before cooling in iced water. This residence time is estimated to be below 1.5 seconds in any case, normally around 1 second.

For each synthesis the two precursor solutions 2, 14 were prepared and used within three hours. After a synthesis, the reactor was cleaned by flushing with water at high flowrates and performing multiple pressure cycles by shutting and opening the cleaning valve before the pressure release valve 12. Furthermore, the pressure release valve 12 was disassembled, cleaned thoroughly, and reassembled.

The products from the synthesis, typically around 350 ml of liquid with precipitating particles, were collected in glass containers 22. A filtering set-up was used to separate the solid products and the supernatant. This consists of a fish-tank pump connected to a Büchner flask and funnel. The filters used were retrieved from MILLIPORE, type GPWP, 0.22 μm.

After filtration the solid products were left to dry for at least a day. This was followed by grinding to a fine powder.

The following parameters were selected:

Synthesis 1: Temperature Variation

A series of syntheses varying the temperature was performed. The other parameters were set as follows:

Temperature of the Preheater 5 was set at varied values from 100° C. to 400° C. reported in table 1.

Pressure: 250 bar.

Mix temperature: The temperature at the mixing point 10 between the preheated line 30 and the cold line 31 was surveyed with a thermocouple 9 placed inside the tubing 10. Values are reported in table 1

Preheated line 30: the precursor was an aqueous solution 0.005 M $Na_3PO$

Flow rate in the preheated line 30: 10 ml/min

Cold line 31: the precursor was an aqueous solution 0.015 M $Zn(acetate)_2 \cdot 2H_2O$, Flow rate in the cold line 31: 5 ml/min

TABLE 1

Matching preheater 5 temperatures and mixing point 10 temperatures.

| Example | 1 | 2 | 3 | 4 | 5 | 6 | 7 | 8 | 9 |
|---|---|---|---|---|---|---|---|---|---|
| T(° C.) Preheater | RT | 100 | 150 | 200 | 250 | 300 | 350 | 375 | 400 |
| T(° C.) Mix Point | 20.2 ± 1 | 75 ± 1 | 110 ± 2 | 146 ± 5 | 183 ± 4 | 222 ± 10 | 286 ± 5 | 336 ± 20 | 365 ± 10 |

Synthesis 2: Precursor Variation

A series of syntheses varying the precursor was performed. The parameters were the same as in synthesis 1 (except cold line precursor). Temperature of the Preheater 5 was set at 200° C.

The other parameters were set as follows:

Synthesis of hopeite:

the cold line precursor was an aqueous solution 0.005 M $H_3PO_4$ with pH neutralized using ammonia (example 10).

the cold line precursor was an aqueous solution 0.005 M $H_3PO_4$ with pH neutralized using sodium hydroxide (example 11).

the cold line precursor was an aqueous solution 0.005 M hypophosphoric acid, $H_4P_2O_6$, with pH neutralized using ammonia (example 12).

the cold line precursor was an aqueous solution 0.005 M hypophosphoric acid, $H_4P_2O_6$, with pH neutralized using sodium hydroxide (example 13).

Synthesis of zinc-iron phosphate hydrate, $Zn_2Fe(PO_4)_2 \cdot 4H_2O$:

the cold line precursor was an aqueous solution 0.010 M $Zn(acetate)_2 \cdot 2H_2O$ plus 0.005 M $Fe(acetate)_2$ (example 14).

Characterization:

X-Ray Diffraction: The PXRD experiments were performed using PANalytical diffractometers, model X'PERT MPD PRO with copper tubes. The PXRD data analysis performed in this study was all carried out using the free software package FullProf. Sample preparation included the following steps: Sieving the powder. Depending on the experienced difficulty, either a 45 μm or a 100 μm sieve was utilized. Distribution of the powder in the sample holder and compaction carried out with the use of a razorblade. Only cut-like movements perpendicular to the sample surface were used to avoid introducing preferential orientation. Any excess of powder was removed.

Thermogravimetric analysis: The instrument was model SDT Q600 manufactured by TA Instruments. The TGA analysis was carried out using a heating rate of 5° C./min, starting from room temperature and ending at 500° C. As inert atmosphere, argon was used at a flow of 100 ml/min. The masses of the samples were between 21 mg and 25 mg.

Scanning Electron Microscopy: a JEOL SEM was used. The electron source was a wolfram filament. Sample preparation: A small amount of dry powder was taken with a spatula. This was sprinkled on carbon tape on top of the sample holder. The sample was metallized with gold for a few seconds. The sample was placed in the SEM chamber and the pressure was lowered to around $10^{-5}$ mbar. The working distance was 13 to 14 mm and the accelerating voltage was maintained at 15 kV.

ICP-OES (Inductively coupled plasma optical emission spectroscopy): The apparatus was of type Varian 720-ES.

Yields:

The yield was determined as follows: After the synthesis was stabilized and solid material was observed, the product was collected for 30 minutes. The theoretical mass of hopeite for a 100% yield was 0.3436 g. The product was left for a night, filtered, dried, transferred to weighing paper and weighed.

Results:

TABLE 2 results of sample analysis. Example 8, 9, 10 & 11 were not characterized due to poor yields.

| Example N° | Structural model | Particle size (nm) | Anisotropy (nm) | Total weight loss (%)* | Yields (%) |
|---|---|---|---|---|---|
| 1 | α hopeite | 205.5 | 21.5 | 20.47 | 85.44 |
| 2 | α hopeite | 116.4 | 17.5 | | |
| 3 | α hopeite | 86.0 | 15.5 | | |
| 4 | β hopeite | 82.8 | 4.9 | | |
| 5 | β hopeite | 141.2 | 17.4 | 19.11 | 98.69 |
| 6 | β hopeite | 90.6 | 13.6 | | |
| 7 | α hopeite | 105.1 | 20.6 | | |
| 12 | hopeite** | | | | |
| 13 | hopeite** | | | | |
| 14 | β hopeite** | 147.8 | 35.0 | | |

*Total sample weight loss upon heating to 500° C. in TGA analysis
**The diffractograms were only used for phase determination; no Rietveld refinements were attempted. The exact role of the hypophosphate ion is unknown but presumed to substitute into the normal phosphate positions. Other crystalline phases were also seen.
***The PXRD diffractogram was best fitted using a β hopeite model and not phosphophyllite as expected. No other crystalline phases were observed within the limit of resolution. The color of the powder was brownish compared to the white hopeite powder, indicating that iron had been introduced in the structure.

Figure 3:
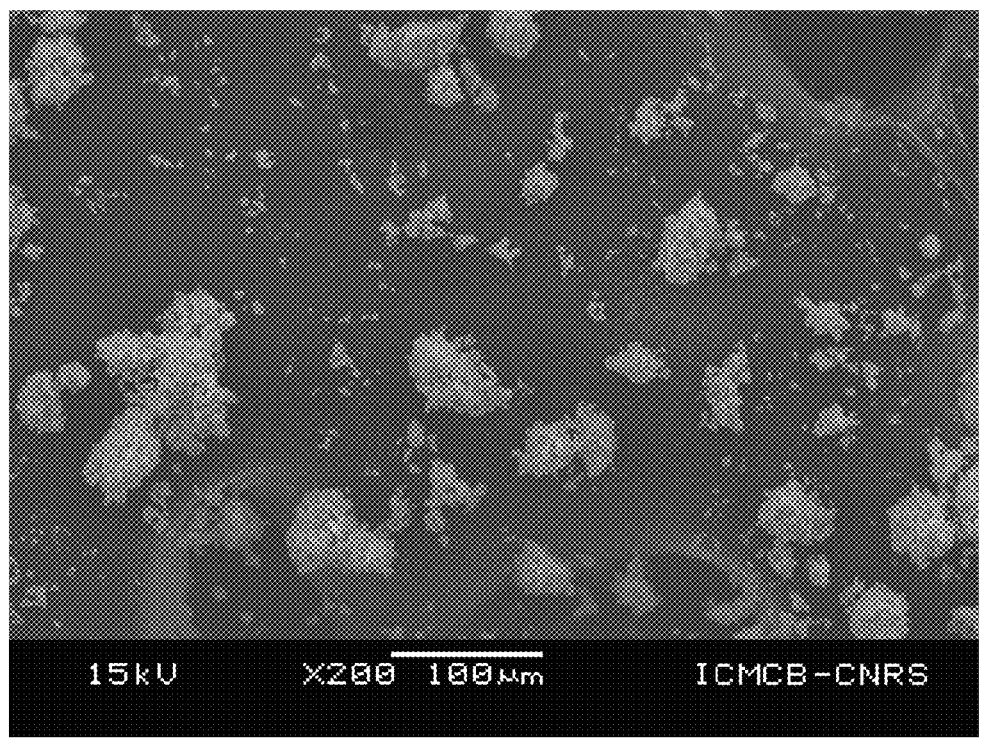
FIG. 3: Picture obtained by SEM of the sample of example 5 with a magnification factor of 200.
Figure 4:
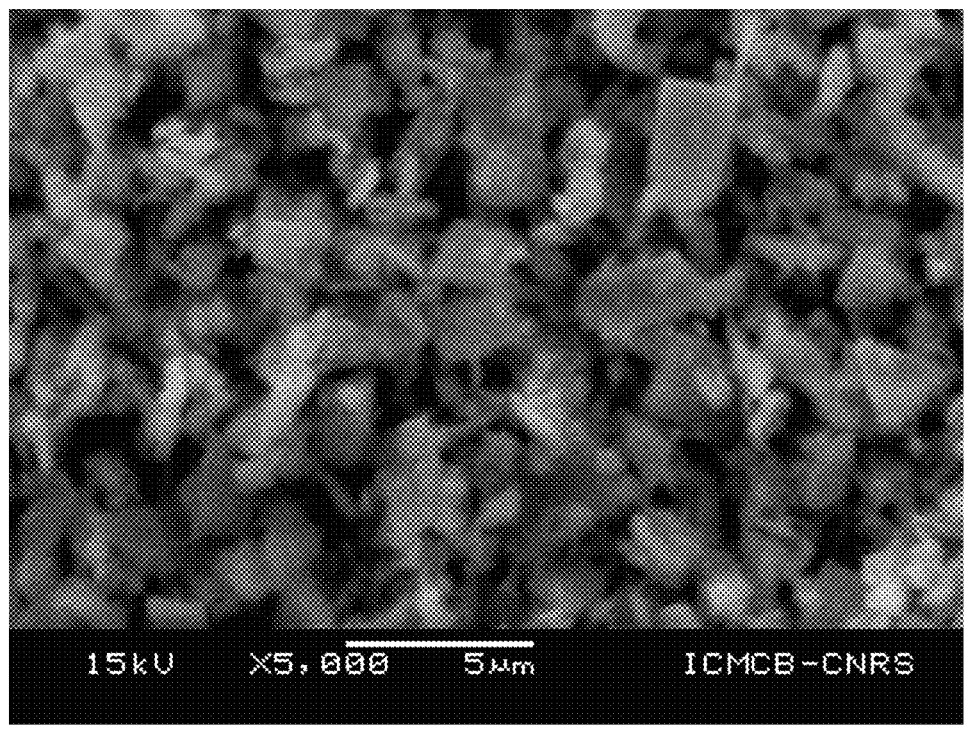
FIG. 4: Picture obtained by SEM of the sample of example 5 with a magnification factor of 5000.
Figure 5:
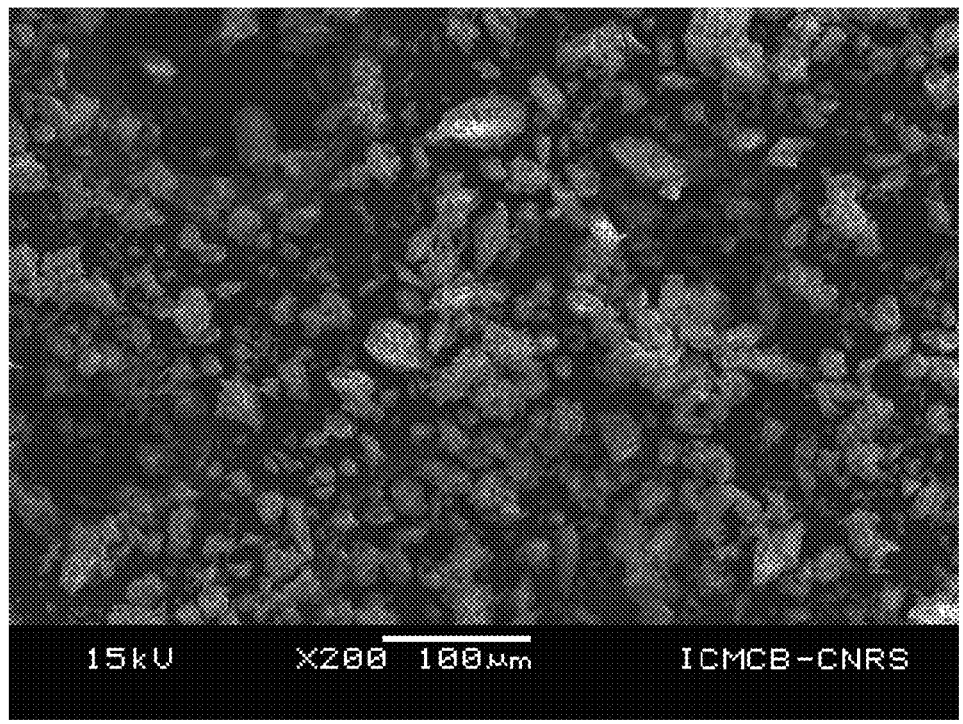
FIG. 5: Picture obtained by SEM of the sample of example 1 with a magnification factor of 200.
Figure 6:
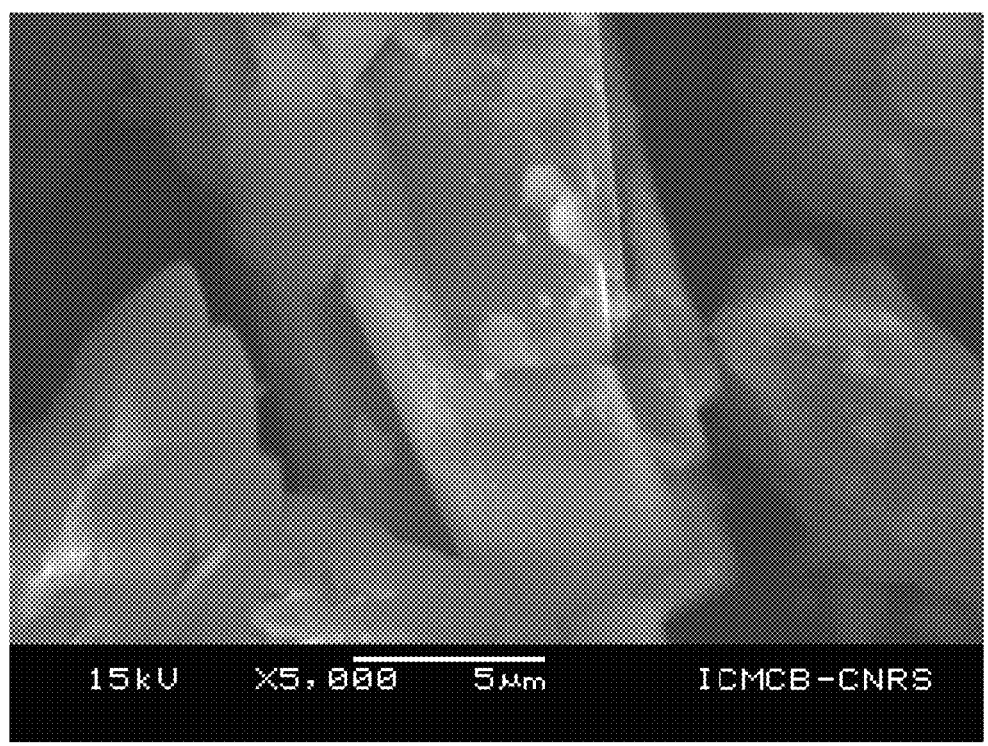
FIG. 6: Picture obtained by SEM of the sample of example 1 with a magnification factor of 5000.

SEM Analysis:

SEM pictures illustrate the morphology variations of the particles produced at room temperature (example 1, FIGS. 5 and 6) and 250° C. (example 5, FIGS. 3 and 4). The sample synthesized at room temperature consists of particles that are substantially larger than the ones observed for the other samples. The size distribution is relatively narrow; the majority of particles have sizes between 15 µm and 25 µm. The stacking of sheets is clearly seen, and a twist in the stacking direction causes flower-like morphologies. At 250° C. this flower-like structure disappears and can be compared to big islands of minor particles with 50-100 µm sizes. Overall, agglomeration of crystallites and formation of particles on the micrometer scale is seen. The particles are built up from smaller sheets and flakes. Raising the temperature decreases the particle size as well as size of the sheets.

The invention claimed is:

1. A method for manufacturing transition metal phosphate hydrate nanoparticles comprising:
    selecting a metal reactant from transition metals,
    selecting a phosphate precursor from at least one of: Trisodium phosphate $Na_3PO_4$, disodium phosphate $Na_2HPO_4$, phosphoric acid $H_3PO_4$ and hypophosphoric acid $H4P206$,
    preparing a solution of the phosphate precursor and a solution of the metal reactant,
    pre-heating the solution of the phosphate precursor and/or the solution of the metal reactant before introduction into a solvothermal reactor to a temperature of at least 150° C.,
    submitting a reaction medium comprising at least: the metal reactant, the phosphate precursor and a solvent, to a solvothermal treatment in the solvothermal reactor at a pressure greater than 5 MPa, and at a temperature of from 100 to 350° C., wherein the solvothermal treatment is applied for a length of time less than or equal to 10 seconds.

2. The method according to claim 1, wherein the method is a continuous flow method.

3. The method according to claim 1, wherein after the submitting step it comprises a step:
    conditioning the reaction medium obtained at the end of the submitting step at a temperature below the temperature of a supercritical area of the solvent.

4. The method according to claim 1, wherein metal precursors are selected from salts, oxides, hydroxydes of transition metals.

5. The method according to claim 1, wherein the solvent is selected from water, an alcohol and mixtures of water with an alcohol.

6. The method according to claim 1, wherein the concentration of the metal precursor in the reaction medium is from 0.0001 mol/l to the solubility limit.

7. The method according to claim 1, wherein the concentration of the phosphate precursor in the reaction medium is from 0.0001 mol/l to the solubility limit.

8. The method according to claim 1, wherein the temperature of the reaction medium in the submitting step is at least 150° C.

9. The method according to claim 1, wherein the pressure of the reaction medium in the submitting step is from 10 MPa to 28 MPa.

10. The method according to claim 1, wherein the reaction medium further comprises at least one ligand precursor.

11. The method according to claim 10, wherein the ligand precursor is an organic ligand comprising a phosphate acid group or a phosphonic acid group.

12. The method according to claim 10, wherein a molar ratio of ligand precursor/metal precursor in the reaction medium is from 0.05 to 10.

13. The method according to claim 4, wherein metal precursors are selected from salts and oxides of Zn and Fe.

* * * * *